US010212033B2

(12) United States Patent
Nakata et al.

(10) Patent No.: US 10,212,033 B2
(45) Date of Patent: Feb. 19, 2019

(54) NETWORK SETTING CHANGE METHOD AND SYSTEM THEREOF, AND TERMINALS WHICH ARE USED WITH SAID SYSTEM

(75) Inventors: Tsuneo Nakata, Tokyo (JP); Masato Kudou, Tokyo (JP); Junichi Funada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 472 days.

(21) Appl. No.: 14/119,930

(22) PCT Filed: May 25, 2012

(86) PCT No.: PCT/JP2012/063423
§ 371 (c)(1),
(2), (4) Date: Nov. 25, 2013

(87) PCT Pub. No.: WO2012/161300
PCT Pub. Date: Nov. 29, 2012

(65) Prior Publication Data
US 2014/0089476 A1    Mar. 27, 2014

(30) Foreign Application Priority Data
May 26, 2011   (JP) ................................. 2011-117974

(51) Int. Cl.
*H04L 12/24* (2006.01)
*H04W 24/02* (2009.01)
*H04W 84/18* (2009.01)

(52) U.S. Cl.
CPC ......... *H04L 41/0813* (2013.01); *H04W 24/02* (2013.01); *H04W 84/18* (2013.01)

(58) Field of Classification Search
CPC .... H04L 41/0813; H04W 24/02; H04W 84/18
See application file for complete search history.

(56) References Cited

U.S. PATENT DOCUMENTS

2004/0019807 A1* 1/2004 Freund ......................... 713/201
2005/0223086 A1* 10/2005 Raverdy et al. ............. 709/220
(Continued)

FOREIGN PATENT DOCUMENTS

JP    2007-189433 A    7/2007
JP    2009-88750 A     4/2009
(Continued)

OTHER PUBLICATIONS

International Search Report for PCT Application No. PCT/JP2012/063423 dated Aug. 14, 2012.
(Continued)

*Primary Examiner* — Philip J Chea
*Assistant Examiner* — Robert B McAdams

(57) ABSTRACT

The present invention is provided to implement an automated setting change of network setting items on an ad hoc network which does not have a specific base station. A method of changing network setting for changing setting of a network where a plurality of terminals are connected, the method including the steps of: a request source terminal transmitting a request for setting change to a selected representative terminal; the selected representative terminal, upon receiving the request for setting change, transmitting a request for permission to at least a majority of representative terminals; the selected representative terminal transmitting a success notification to the request source terminal upon receiving a notification of permission from the majority of representative terminals in response to the request for permission; the request source terminal transmitting, to the plurality of terminals, an execution instruction including at least a content of setting change, upon receiving the success notification; and the terminal which has received the execution instruction changing the setting according to the content of setting change.

11 Claims, 7 Drawing Sheets

(56) References Cited

U.S. PATENT DOCUMENTS

| | | | |
|---|---|---|---|
| 2005/0246312 A1 | 11/2005 | Jordan et al. | |
| 2006/0256731 A1* | 11/2006 | Jennings et al. | 370/252 |
| 2007/0282895 A1* | 12/2007 | Sakamaki | H04L 41/0869 |
| 2013/0035114 A1* | 2/2013 | Holden et al. | 455/456.3 |

FOREIGN PATENT DOCUMENTS

| | | |
|---|---|---|
| JP | 2009-206933 A | 9/2009 |
| JP | 2010-220210 A | 9/2010 |
| JP | 2010-245608 A | 10/2010 |
| JP | 2010-273341 A | 12/2010 |

OTHER PUBLICATIONS

Suyang Ju et al: "Cognitive Multipath Multi-Channel Routing Protocol for Mobile Ad-Hoc Networks", GLOBECOM 2010, 2010 IEEE Global Telecommunications Conference, IEEE, Piscataway, NJ, USA, Dec. 6, 2010 (Dec. 6, 2010), pp. 1-6, XP031846177, ISBN: 978-1-4244-5636-9 II. The Proposed DCP-CCC; p. 228-p. 231.

Mi-Ryeong Kim et al: "Distributed Coordination Protocol for Common Control Channel Selection in Multichannel Ad-Hoc Cognitive Radio Networks", Wireless and Mobile Computing, Networking and Communications, 2009. WIMOB 2009. IEEE International Conference on, IEEE, Piscataway, NJ, USA, Oct. 12, 2009 (Oct. 12, 2009), pp. 227-232, XP031562891, ISBN: 978-0-7695-3841-9 C. Spectrum Discovery Protocol; p. 3-p. 4; figure 1.

Extended European Search Report of EP Application No. 12788807.1 dated Mar. 20, 2015.

T. Clausen et al., "The Optimized Link State Routing Protocol version 2", draft-ietf-manet-olsrv2-11, Mobile Ad hoc Networking (MANET), Apr. 20, 2010, pp. 1-83.

Extended European Search Report for EP Application No. EP12788807.1 dated Apr. 12, 2017.

* cited by examiner

NETWORK SETTING CHANGE METHOD AND SYSTEM THEREOF, AND TERMINALS WHICH ARE USED WITH SAID SYSTEM

This application is a National Stage Entry of PCT/JP2012/063423 filed on May 25, 2012, which claims priority from Japanese Patent Application 2011-117974 filed on May 26, 2011, the contents of all of which are incorporated herein by reference, in their entirety.

TECHNICAL FIELD

The present invention relates to a network setting change method and system thereof and terminals which are used with said system for changing network setting.

The present invention relates to a network setting change method and system thereof and terminal which is used with said system for changing network setting.

BACKGROUND ART

In a cognitive network, as it may be assumed that network setting, such as frequency, radio modulation method, and access scheme are dynamically changed in each terminal, it is necessary for each terminal to include a mechanism to determine desirable network setting. This may be achieved, for example, by a mechanism in which each terminal receives information provided through a specific radio channel called "cognitive pilot channel", which is shared among all terminals so that each terminal may determine own network setting based on this information.

A method of changing a radio system without accessing the cognitive pilot channel is disclosed in Patent Literature 1. In this method, a part of an existing method's radio frame includes information related to availability of other method's radio systems so that each terminal having received such information may select, from among a plurality of radio systems, a system to be used.

CITATION LIST

Patent Literature

{PTL 1} JP-A-2010-220210
{PTL 2} JP-A-2007-189433
{PTL 3} JP-A-2009-206933
{PTL 4} JP-A-2010-273341

SUMMARY OF INVENTION

Technical Problem

However, in all of these methods, the terminal determines the setting based on information from a base station, and therefore none of the methods may be applied to an ad hoc network which does not depend on a specific base station. A method of automating routing, etc. in the ad hoc network is disclosed, for example, in the IETF Proposed Standard "draft-ietf-manet-olsrv2-11". However, this method may not be applied to automation of the setting change for items such as frequency, radio modulation method and access scheme, which are required to be uniformly selected by all terminals on a network.

An object of the present invention is to provide a network setting change method and system thereof and terminals which are used with said system to implement, on an ad hoc network having no specific base station, automation of the setting change for items (hereinafter referred to as network setting items) such as frequency, radio modulation method and access scheme, which are required to be uniformly selected by all the terminals on the network.

Solution to Problem

According to a first aspect of the present invention, provided is a network setting changing method for changing setting of a network where a plurality of terminals are connected, the method including: a step in which a request source terminal transmits a setting change request to a selected representative terminal; a step in which the selected representative terminal transmits permission requests to at least a majority of representative terminals upon receiving the setting change request; a step in which the selected representative terminal transmits a success notification to the request source terminal upon receiving a permission notifications from the majority of representative terminals in response to the permission requests; a step in which the request source terminal transmits, to the plurality of terminals, an execution instruction including at least a content of setting change upon receiving the success notification; and a step in which the terminals which have received the execution instruction change the setting according to the content of setting change.

According to a second aspect of the present invention, provided is a network setting changing system for changing setting of a network where a plurality of terminals are connected, the system comprising a request source terminal comprising means configured to transmit a setting change request to a selected representative terminal; the selected representative terminal comprising means configured to transmit a permission request to at least a majority of representative terminals upon receiving the setting change request; the selected representative terminal comprising means configured to transmit a success notification to the request source terminal upon receiving permission notifications from the majority of representative terminals in response to the permission requests; the request source terminal comprising means configured to transmit, to the plurality of terminals, execution instructions including at least a content of setting change upon receiving the success notification; and each of terminals, which have received the execution instructions, comprising means configured to change the setting according to the content of setting change.

Advantages Effects of the Invention

According to the present invention, it is possible to implement, on an ad hoc network which does not have a specific base station, automation of setting change for items (hereinafter referred to as network setting items) such as frequency, radio modulation method, and access scheme, which are required to be uniformly selected by all terminals on a network.

Figure 1:
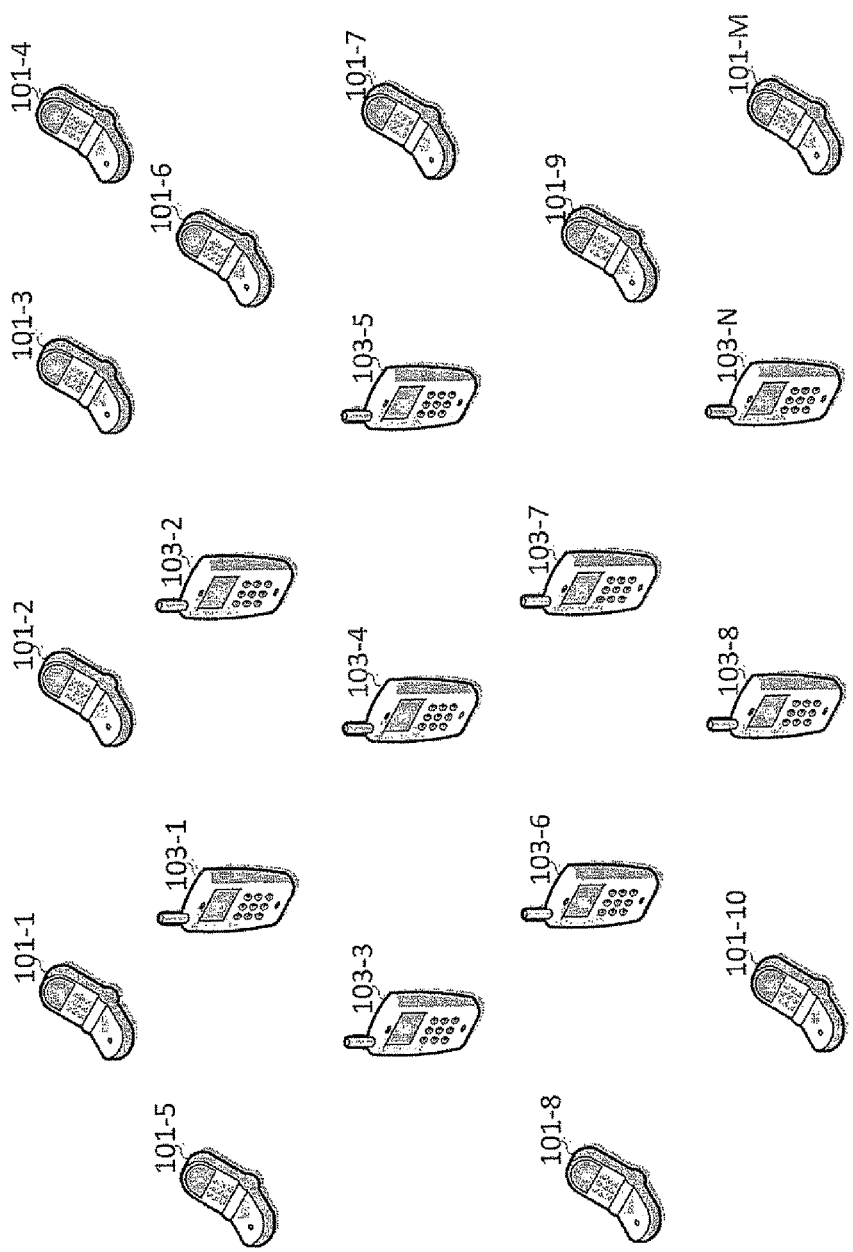
FIG. 1 A conceptual diagram illustrates terminals included in a network according to an embodiment of the present invention.

REFERENCE SIGNS LIST 101-1, 101-2, . . . , 101-M non-representative terminal
103-1, 103-2, . . . , 103-N representative terminal
151 antenna
153 circulator
155 receiving section
157 transmitting section
159 data/sound/image processing section
161 storage section
163 interface section {Description Of Embodiments}

Embodiments for carrying out the present invention will be described in detail below with reference to the drawings.

According to the present embodiment, some of terminals are selected as representative terminals. Each terminal detects, independently of the other terminals, necessity of changing setting for a network setting item. Upon detecting such necessity, the terminal transmits, to any one of the representative terminals, a request for a right to change the network setting item. The representative terminal having received such a request transfers the request to other representative terminals, and in a case of receiving permission from a majority of representative terminals, the representative terminal notifies a request source terminal of the permission. The terminal having received such a permission notification notifies all the terminals about contents of change related to the network setting item and a validation time thereof.

For a method of selecting some of the terminals as the representative terminals, a method where terminals selected as Multi Point Relay (MPR) are selected as the representative terminals may be adopted, as described in the IETF Proposed Standard "draft-ietf-manet-olsrv2-11", for example. In this case, it is a precondition that control of an ad hoc network itself is conducted by a method described in "draft-ietf-manet-olsrv2-11".

The respective representative terminals thus selected are configured to perform operations as shown in a flowchart in FIG. 1.

{First Embodiment}

Referring to FIG. 1, reference signs 101-1, 101-2, . . . , and 101-M indicate non-representative terminals. Reference signs 103-1, 103-2, . . . , and 103-N indicate representative terminals.

Figure 2:
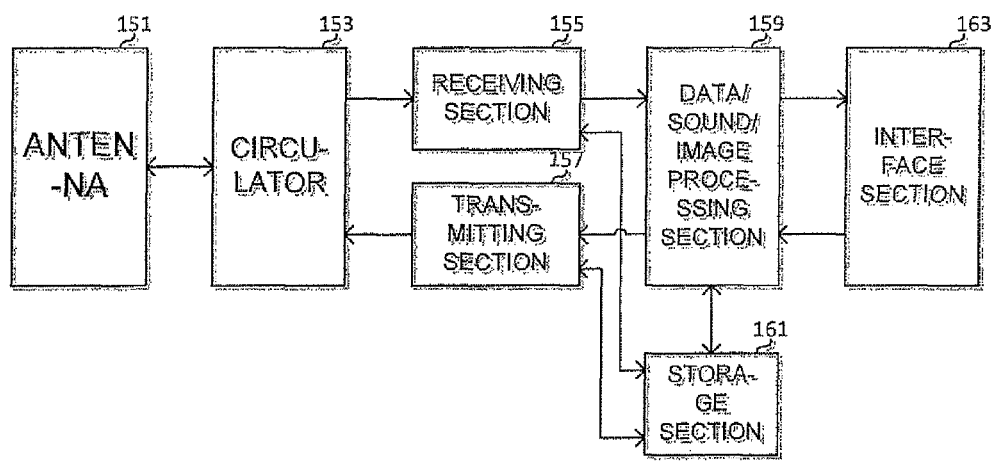
FIG. 2 A block diagram illustrates an internal configuration of a terminal according to the embodiment of the present invention.

Referring to FIG. 2, the non-representative terminal and the representative terminal each include an antenna 151, a circulator 153, a receiving section 155, a transmitting section 157, a data/sound/image processing section 159, a storage section 161, and an interface section 163.

The antenna 151 transmits a signal input from the circulator 153 as a radio wave, and outputs a received radio wave to the circulator 153 as a signal. The circulator 153 outputs a signal input from the antenna 151 to the receiving section 155 and also outputs a signal input from the transmitting section 157 to the antenna 151. The receiving section 155 performs frequency conversion, modulation, etc. of the signal input from the circulator 153 and outputs a signal representing data, sound, or an image to the data/sound/image processing section 159. The transmitting section 157 receives the signal representing data, sound, or an image from the data/sound/image processing section 159 and then performs modulation, frequency conversion, etc. of the received signal, thereafter outputting the signal to the circulator 153. The data/sound/image processing section 159 performs data processing to a signal representing data, sound processing (sound coding, sound decoding, etc.) to a sound signal, and image processing (image coding, image decoding, etc.) to an image signal. The interface section 163 includes user interfaces (microphone, speaker, image display portion, input key, etc.), external device interfaces and so on. The storage section 161 is capable of reading and writing data from/in the receiving section 155, the transmitting section 157, and the data/sound/image processing section 159. Particularly, the storage section 161 stores network setting items set in the data/sound/image processing section 159 and these items are read and utilized by the receiving section 155 and the transmitting section 157.

The respective terminals 101-1, 101-2, . . . , 101-M 103-1, 103-2, . . . , and 103-N determine necessity of changing network setting based on a radio environment measurement result and the like in the respective terminals themselves. For example, in a case of detecting any interfering radio at a frequency currently used, it indicates that necessity of changing the current frequency to other is detected. A terminal 101-$i$ (i is an integer of 1 or more and M or less) or a terminal 103-$j$ (j is an integer of 1 or more and N or less) having detected such change necessity selects an arbitrary representative terminal 103-$k$ (k is an integer of 1 or more and N or less) and then transmits a request for setting change to the selected representative terminal 103-$k$ (step S201 in FIG. 3). Here, the terminal 103-$j$ having detected the change necessity may issue the request for setting change to itself as well.

Figure 3:
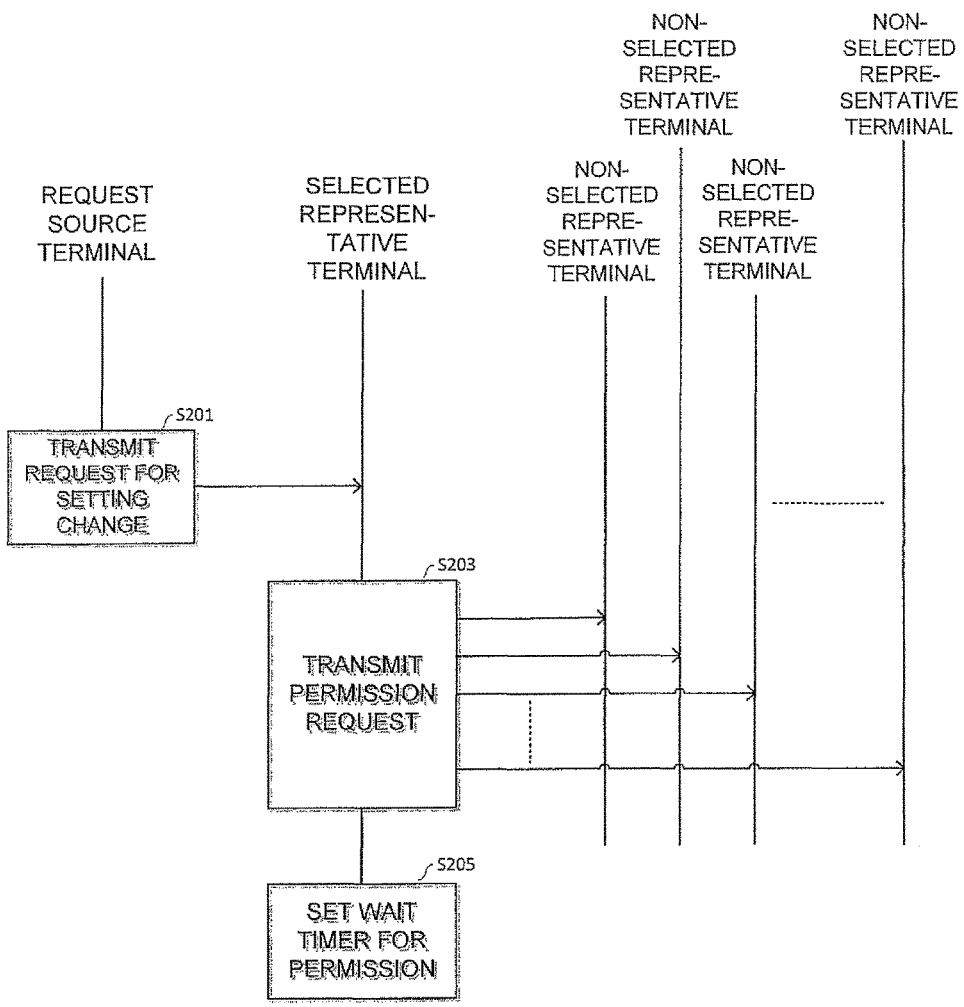
FIG. 3 A flowchart (1/3) describes a method of changing network settings according to the embodiment of the present invention.

The representative terminal 103-$k$ having received the setting change request transmits, to at least a majority of the representative terminals among other representative terminals 103-$p$ (k≠p, p is an integer of 1 or more and N or less), a permission request to retain a right to change the network setting (step S203 in FIG. 3). Here, in a case of the representative terminal 103-$k$ issuing the permission request to itself as well, this may be regarded as one transmission. Accordingly, the number of the representative terminals to which the permission requests are transmitted may include the representative terminal 103-$k$ to reach a majority of the representative terminals. Subsequently, the representative terminal 103-$k$ sets a wait timer for permission at a predetermined value and starts the timer (step S205 in FIG. 3).

If permission notifications are obtained from the majority of representative terminals in response to the transmitted permission request (step S211 in FIG. 4), the permission request results in success and the source terminal of the setting change request 101-$i$ or 103-$j$ may obtain a right to change.

Figure 4:
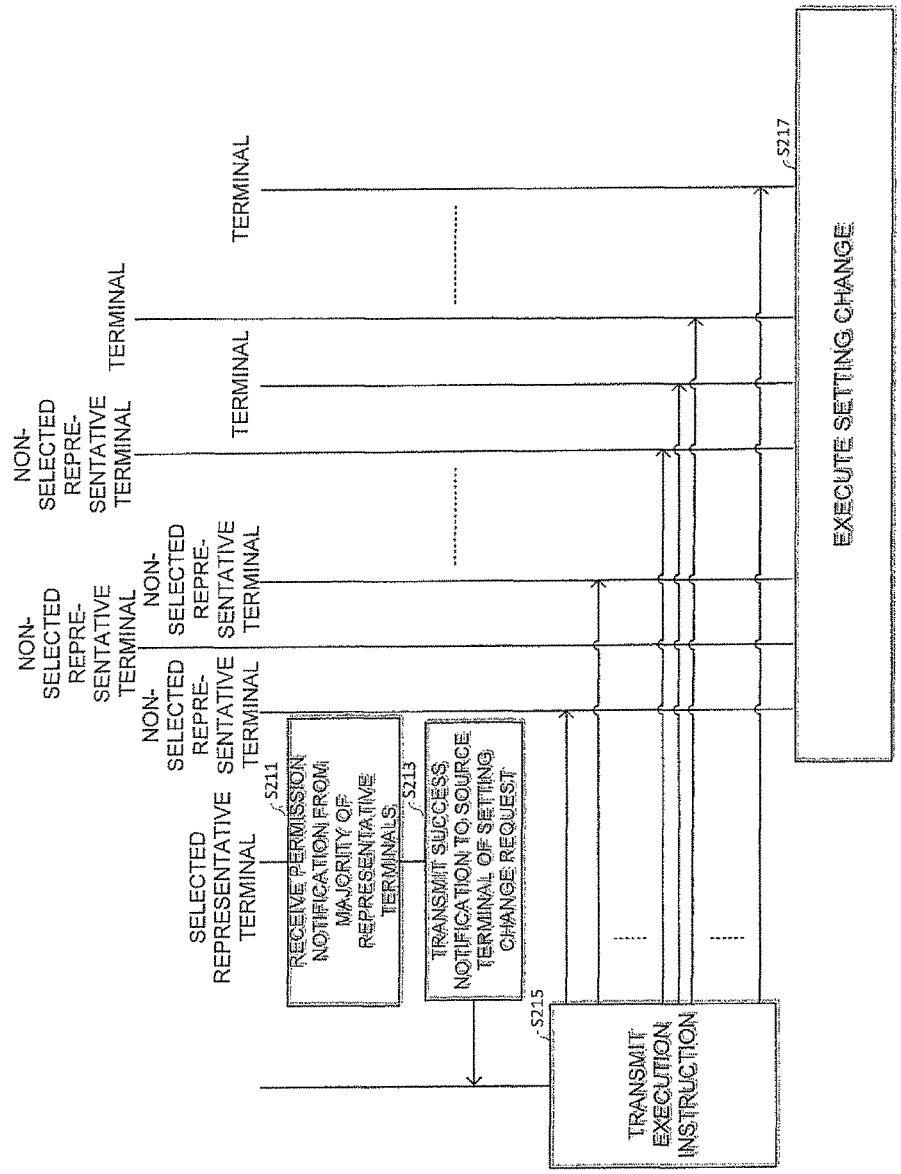
FIG. 4 A flowchart (2/3) describes a method of changing network settings according to the embodiment of the present invention.

Then, the representative terminal 103-$k$ transmits a success notification to the source terminal of the setting change request 101-$i$ or 103-$j$ (step S213 in FIG. 4). The terminal 101-*i* or 103-*j* having received the success notification transmits an execution instruction to all the terminals 101-1, 101-2, . . . 101-M, 103-1, 103-2, . . . , and 103-N including the representative terminals. The execution instruction includes a content of setting change, an execution time of the change, and failure information related to a cause having necessitated the setting change (step S215 in FIG. 4). Here, it should be noted that the terminal 101-*i* or 103-*j* issues the execution instruction to itself as well. When the execution time of change comes, the terminals 101-1, 101-2, . . . 101-M, 103-1, 103-2, . . . , and 103-N change the setting in accordance with the content of setting change (step S217 in FIG. 4).

Figure 5:
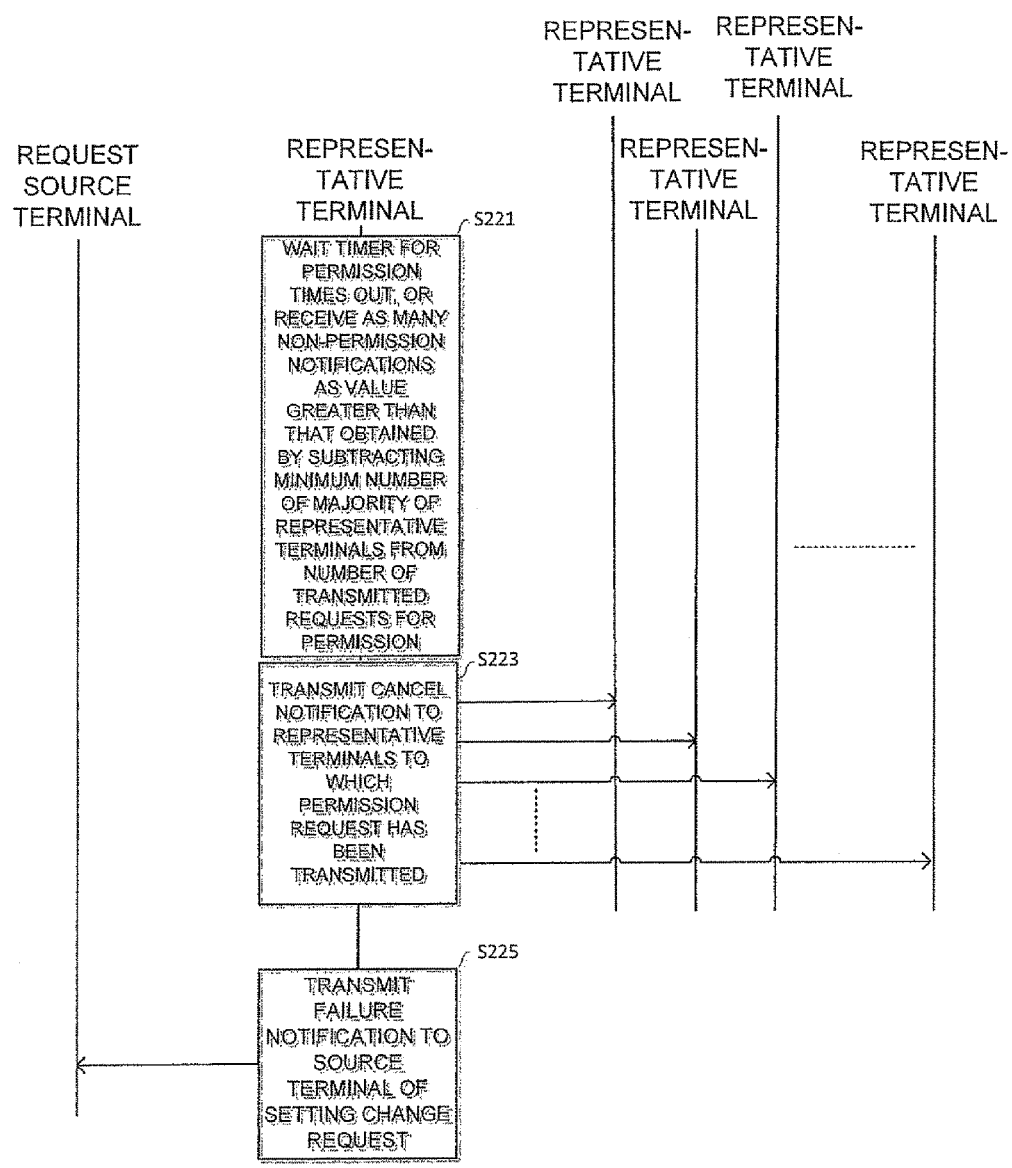
FIG. 5 A flowchart (3/3) describes a method of changing network settings according to the embodiment of the present invention.

On the other hand, if the representative terminal 103-*k* having transmitted the permission request receives non-permission notifications, or if the wait timer for permission times out (step S221 in FIG. 5), the representative terminal 103-*k* determines that obtainment of a right to change has failed and transmits a cancel notification to the representative terminals to which the permission request has been transmitted (step S223). The non-permission notifications in this case are as many as a value from which it may be determined that obtaining a permission from the majority of representative terminals is impossible (i.e., the value greater than that obtained by subtracting a minimum value of the majority of the representative terminals from the number of the transmitted permission requests). Also, the representative terminal 103-*k* transmits a failure notification to the source terminal of the setting change request 101-*i* (step S225 in FIG. 5).

Further, the representative terminal 103-*p* having received the permission request from the representative terminal 103-*k* returns the non-permission notification to the representative terminal 103-*k* in either one of the following cases: (1) the representative terminal 103-*p* has already transmitted the permission notification to the representative terminal 103-*k*; or (2) the representative terminal 103-*p* has already received an execution instruction and the execution time has not come yet. Otherwise, the representative terminal 103-*p* returns the permission notification.

Figure 6:
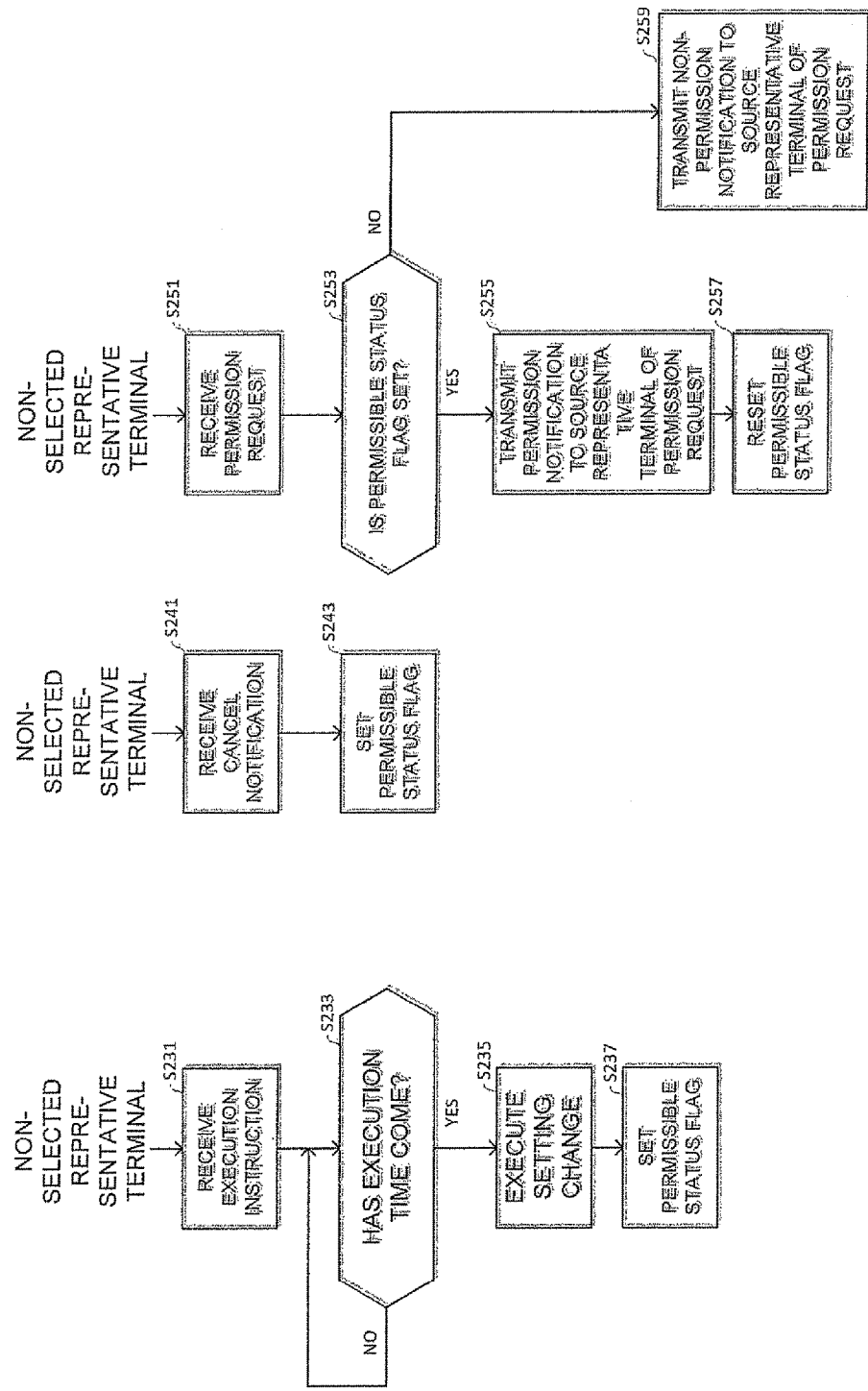
FIG. 6 A flowchart describes operation of a representative terminal according to the embodiment of the present invention.

To describe more about the operation of the representative terminal 103-*p* in the foregoing paragraphs, the representative terminal 103-*p*, upon receiving the execution instruction (step S231 in FIG. 6), waits for the execution time to come (the loop of step S233 in FIG. 6), and, when the execution time comes (YES in step S233 in FIG. 6), sets a permissible status flag (step S235 in FIG. 6). Further, in a case of receiving the cancel notification (step S241 in FIG. 6), the representative terminal 103-*p* sets a permissible status flag (step S243 in FIG. 6). Further, in a case of receiving the permission request (step S251 in FIG. 6), the representative terminal 103-*p* determines whether the permissible status flag is set (step S253 in FIG. 6). If the flag is set (YES in step S253 in FIG. 6), the representative terminal 103-*p*, after transmitting the permission notification to the source representative terminal 103-*k* of the permission request (step S255 in FIG. 6), resets the permissible status flag (step S257 in FIG. 6) If the flag is reset (NO in step S253 in FIG. 6), the representative terminal 103-*p* transmits a notification of non-permission to the source representative terminal 103-*k* of the permission request (step S259).

Figure 7:
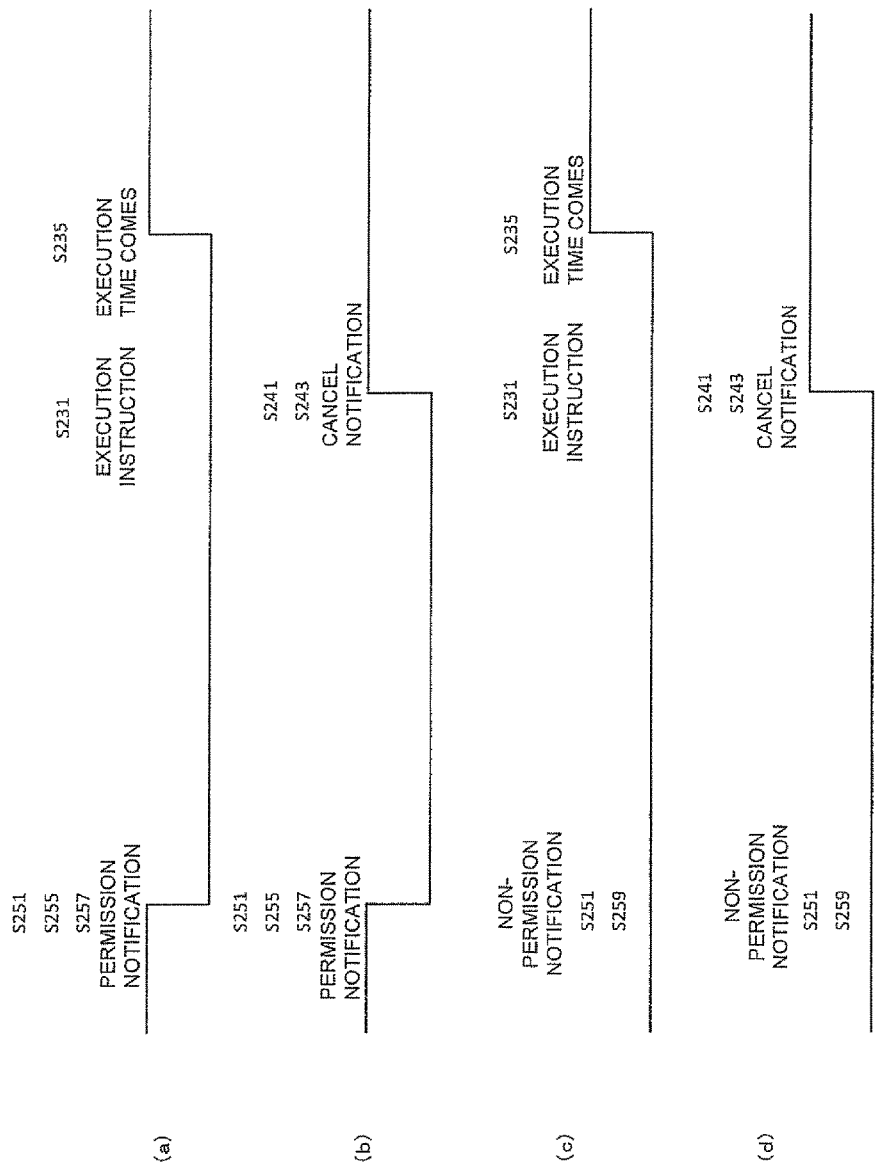
FIG. 7 A timing chart illustrates changes of a permissible status flag used in a representative terminal according to the embodiment of the present invention.

Referring to FIG. 7(*a*), at a time of receiving the permission request (step S251), if the permissible status flag is set (YES in step S253), the representative terminal 103-*p* transmits the permission notification (step S255) and also resets the permissible status flag (step S257). Subsequently, the representative terminal 103-*p* receives an execution instruction (step S231) and, when the execution time comes (YES in step S233), sets the permissible status flag (step S235).

Referring to FIG. 7(*b*), at a time of receiving the permission request (step S251), if the permissible status flag is set (YES in step S253), the representative terminal 103-*p* transmits the permission notification (step S255) and also resets the permissible status flag (step S257). Subsequently, upon receiving the cancel notification (step S241), the representative terminal 103-*p* sets the permissible status flag (step S243).

Referring to FIG. 7(*c*), at a time of receiving the permission request (step S251), if the permissible status flag is reset (NO in step S253), the representative terminal 103-*p* transmits the non-permission notification (step S259). Subsequently, the representative terminal 103-*p* receives the execution instruction (step S231), and, when execution time comes (YES in step S233), executes the setting change (step S235). Then, the representative terminal 103-*p* sets the permissible status flag (step S237).

Referring to FIG. 7(*d*), at a time of receiving the permission request (step S251), if the permissible status flag is reset (NO in step S253), the representative terminal 103-*p* transmits the non-permission notification (step S259). Subsequently, upon receiving the cancel notification (step S241), the representative terminal 103-*p* sets the permissible status flag (step S243).

The above-described operations may prevent the plurality of terminals from obtaining rights to change. This is because the respective representative terminals return the permission to only one terminal and therefore the plurality of representative terminals may not be able to obtain the permission from the majority of the representative terminals.

Also, notifying all the terminals of the change execution time allows all the terminals to execute the setting change at the same time, and therefore network disconnection time may be avoided.

As a result, in a case where a plurality of terminals issue different requests for changing network setting, only the setting change issued by one terminal is to be executed.

If the terminal having received the execution instruction determines that some inconvenience may be caused by changing the setting in accordance with the content of setting change contained in the execution instruction, the terminal issues a setting change request in order to transmit an execution instruction including a content of setting change corresponding to neither contents of setting before setting change nor contents of setting after setting change. As a result, the setting may be changed without causing any inconvenience for both the terminal having first issued the request for setting change and the other terminal having later issued the setting change request.

{Second Embodiment}

The following functions are added to the network according to the first embodiment. First, in a case where each terminal detects setting information which may cause inconvenience if selected at the time of setting change, although no trouble has occurred so far, the terminal notifies all terminals of such information related to the inconvenient setting (inconvenient setting information). Each terminal, when generating an execution instruction, selects post-change setting not corresponding to any of the inconvenient setting shared. As a result, the inconvenience may be avoided in other terminals caused by the setting change.

Meanwhile, the above-described each terminal may be achieved by hardware, software, or combination thereof. Further, the method of changing the network setting items executed by the above-described each terminal may be achieved by hardware, software, or combination thereof. Here, the expression "achieved by software" means a computer reading and executing a program.

A program may be stored using various types of a non-transitory computer readable medium and may be supplied to the computer. The non-transitory computer readable medium includes various types of a tangible storage medium. Examples of the non-transitory computer readable medium include a magnetic recording medium (e.g., flexible disk, magnetic tape, hard disk drive), a magnet-optical recording medium (e.g., magneto-optical disk), a CD-ROM (Read Only Memory), a CD-R, a CD-R/W, a semiconductor memory (e.g., mask ROM, a PROM (Programmable ROM), an EPROM (Erasable PROM), a flash ROM, and a RAM (random access memory)). Further, the program may be supplied to the computer by various types of a transitory computer readable medium as well. Examples of the transitory computer readable medium include an electric signal, an optical signal, and an electromagnetic wave. The transitory computer readable medium may supply the program to the computer via a wired channel such as an electric cable or an optical fiber, or via a wireless channel.

A part or entirety of the above-described embodiments may be described as in the following supplementary notes, but are not limited thereto.

(Supplementary Note 1)

A network setting changing method for changing setting of a network where a plurality of terminals are connected, the method including:

a step in which a request source terminal transmits a setting change request to a selected representative terminal;

a step in which the selected representative terminal, upon receiving the setting change request, transmits permission requests to at least a majority of representative terminals;

a step in which the selected representative terminal transmits a success notification to the request source terminal upon receiving permission notifications from the majority of representative terminals in response to the permission request;

a step in which the request source terminal transmits, to the plurality of terminals, an execution instructions including at least a content of setting change upon receiving the success notification; and a step in which the terminals which have received the execution instructions change the setting according to the content of setting change.

(Supplementary Note 2)

The network setting changing method according to supplementary note 1, wherein the execution instruction also includes an execution time of change, and the terminal having received the execution instruction executes the step of changing the setting when the execution time of change comes.

(Supplementary Note 3)

The network setting changing method according to supplementary note 1 or 2, further including a step in which the selected representative terminal transmits a failure notification to the request source terminal upon determining that the permission notifications are not receivable from the majority of representative terminals in response to the permission requests.

(Supplementary Note 4)

The network setting changing method according to any one of supplementary notes 1 to 3, further including:

a step in which the representative terminal, which has transmitted the permission notification in response to the permission request, resets a permissible status flag; and a step in which the representative terminal transmits a non-permission notification instead of the permission notification in response to the permission request in a case where the permissible status flag is reset at a time of receiving the permission request.

(Supplementary Note 5)

The network setting changing method according to supplementary note 4, further including a step in which the representative terminal sets the permissible status flag upon executing the settings.

(Supplementary Note 6)

The network setting changing method according to supplementary note 4 or 5, further including:

a step in which the selected representative terminal, upon determining that the permission notifications are not receivable from the majority of representative terminals in response to the permission requests, transmits cancel notifications to the representative terminals to which the permission requests have been transmitted; and a step in which the representative terminals set the permissible status flags upon receiving the cancel notifications.

(Supplementary Note 7)

The network setting changing method according to any one of supplementary notes 1 to 6, further including a step in which the terminal which has received the execution instruction, upon determining that some inconvenience is to be caused if the terminal itself executes the setting change in accordance with the content of setting change, transmits a setting change request in order to transmit execution instructions including a content of setting change corresponding to neither contents of setting before setting change nor contents of setting after setting change.

(Supplementary Note 8)

The network setting changing method according to any one of supplementary notes 1 to 7, further including a step in which a terminal transmits, to other terminals, information related to inconvenient setting, wherein a terminal having received the success notification after receipt of the information related to inconvenient setting transmits the execution instruction including a content of setting change which makes the setting not the same as the inconvenient setting.

(Supplementary Note 9)

A network setting changing system, for changing setting of a network where a plurality of terminals are connected, the system including:

a request source terminal comprising means configured to transmit a setting change request to a selected representative terminal;

the selected representative terminal comprising means configured to, upon receiving the setting change request, transmit permission requests to at least a majority of representative terminals;

the selected representative terminal comprising means configured to transmit a success notification to the request source terminal upon receiving permission notifications from the majority of representative terminals in response to the permission requests;

the request source terminal comprising means configured to transmit, to the plurality of terminals, execution instructions including at least a content of setting change, upon receiving the success notification; and each of the terminals the terminals, which have received the execution instructions, comprising means configured to change the setting according to the content of setting change.

(Supplementary Note 10)

The network setting changing system according to supplementary note 9, wherein the execution instruction also includes an execution time of change, and the terminal having received the execution instruction executes changing of the setting when the execution time of change comes.

(Supplementary Note 11)

The network setting changing system according to supplementary note 9 or 10, wherein the selected representative terminal comprises means configured to transmit a failure notification to the request source terminal upon determining that the permission notifications are not receivable from the majority of representative terminals in response to the permission request.

(Supplementary Note 12)

The network setting changing system according to any one of supplementary notes 9 to 11, wherein:

the representative terminal, which has transmitted the permission notification in response to the permission request, comprises means configured to reset a permissible status flag, and the representative terminal comprises means configured to transmit a non-permission notification instead of the permission notification in response to the permission request in a case where the permissible status flag is reset at the time of receiving the permission request.

(Supplementary Note 13)

The network setting changing system according to supplementary note 12, wherein the representative terminal comprises means configured to set the permissible status flag upon executing the settings.

(Supplementary Note 14)

The network setting changing system according to supplementary note 12 or 13, wherein:

means for causing the selected representative terminal comprises means configured to, upon determining that the permission notifications are not receivable from the majority of representative terminals in response to the permission requests, transmit cancel notifications to the representative terminals to which the permission requests have been transmitted, and each of the representative terminals comprises means configured to set the permissible status flag upon receiving the cancel notification.

(Supplementary Note 15)

The network setting changing system according to any one of supplementary notes 9 to 14, wherein the terminal which has received the execution instruction comprises means configured to, upon determining that some inconvenience is to be caused if the terminal itself executes the setting change in accordance with the content of setting change, transmit a settings change request in order to transmit execution instructions including a content of setting change corresponding to neither contents of setting before setting change nor contents of setting after setting change.

(Supplementary Note 16)

The network setting changing system according to any one of supplementary notes 9 to 15, wherein a terminal comprises means configured to transmit, to other terminals, information related to inconvenient setting, each of the terminals having received the success notification after receipt of the information related to inconvenient setting transmits an execution instruction including a content of setting change which makes the setting not the same as the inconvenient settings.

(Supplementary Note 17)

A request source terminal included in a network setting changing system for changing setting of a network where a plurality of terminals are connected, the request source terminal including:

means configured to transmit a setting change request to a selected representative terminal; and means configured to transmit, to the plurality of terminals, an execution instructions including at least a content of setting change, upon receiving a success notification from the selected representative terminal.

(Supplementary Note 18)

The request source terminal according to supplementary note 17, including means configured to, upon receiving an execution instruction from another terminal and determining that some inconvenience is to be caused if the terminal itself executes the setting change in accordance with the content of setting change included in the execution instruction, transmit a setting change request in order to transmit execution instructions including a content of setting change corresponding to contents of setting neither before nor after setting change in accordance with the execution instruction received from the another terminal.

(Supplementary Note 19)

The request source terminal according to supplementary note 17 or 18, including means configured to transmit an execution instruction, upon receiving the success notification from the selected representative terminal after receipt of information related to inconvenient setting from another terminal, the execution instruction including a content of setting change which makes the setting not the same as the inconvenient setting.

(Supplementary Note 20)

A selected representative terminal included in a network setting changing system for changing setting of a network where a plurality of terminals are connected, the selected representative terminal including:

means configured to receive a setting change request from a request source terminal;

means configured to transmit permission requests to at least a majority of representative terminals upon receiving the settings change request; and means configured to transmit a success notification to the request source terminal upon receiving permission notifications from the majority of representative terminals in response to the permission request.

(Supplementary Note 21)

The selected representative terminal according to supplementary note 20, including means configured to transmit a failure notification to the request source terminal upon determining that the permission notifications are not receivable from the majority of representative terminals in response to the permission request.

(Supplementary Note 22)

The selected representative terminal according to supplementary note 20 or 21, including means configured to transmit cancel notifications to the representative terminals, to which the permission requests have been transmitted, upon determining that the permission requests are not receivable from the majority of representative terminals in response to the permission requests.

(Supplementary Note 23)

A representative terminal included in a network setting changing system for changing setting of a network where a plurality of terminals are connected, the representative terminal including:
- means configured to receive a permission request from a selected representative terminal;
- means configured to transmit a permission notification to the selected representative terminal in response to the permission request;
- means configured to reset a permissible status flag upon transmitting the permission notification in response to the permission request; and
- means configured to transmit a non-permission notification instead of the permission notification in response to the permission request in a case where the permissible status flag is reset at the time of receiving the permission request.

(Supplementary Note 24)

The representative terminal according to supplementary note 23, including means configured to set the permissible status flag upon executing the setting in accordance with an execution instruction received from a request source terminal.

(Supplementary Note 25)

The representative terminal according to supplementary note 23 or 24, including means configured to set the permissible status flag upon receiving a cancel notification from the selected representative terminal.

(Supplementary Note 26)

A program for causing a computer to function as a request source terminal included in a network setting changing system for changing setting of a network where a plurality of terminals are connected, the program causing the computer to function as:
- means configured to transmit a setting change request to a selected representative terminal; and
- means configured to transmit, to the plurality of terminals, execution instructions including at least a content of setting change, upon receiving a success notification from the selected representative terminal.

(Supplementary Note 27)

The program according to supplementary note 26, further causing the computer to function as means configured to, upon receiving an execution instruction from another terminal and determining that some inconvenience is to be caused if the terminal itself executes the setting change in accordance with the content of setting change included in the execution instruction, transmit a setting change request in order to transmit execution instructions including a content of setting change corresponding to contents of setting neither before nor after setting change in accordance with the execution instruction received from said another terminal.

(Supplementary Note 28)

The program according to supplementary note 26 or 27, further causing the computer to function as means configured to transmit an execution instruction, upon receiving the success notification from the selected representative terminal after receipt of information related to inconvenient setting from another terminal, the execution instruction including a content of setting change which makes the setting not the same as the inconvenient setting.

(Supplementary Note 29)

A program for causing a computer to function as a selected representative terminal included in a network setting changing system for changing setting of a network where a plurality of terminals are connected, the program causing the computer to function as:
- means configured to receive a setting change request from a request source terminal;
- means configured to transmit permission requests to at least a majority of representative terminals upon receiving the setting change request; and
- means configured to transmit a success notification to the request source terminal upon receiving permission notifications from the majority of representative terminals in response to the permission requests.

(Supplementary Note 30)

The program according to supplementary note 29, further causing the computer to function as means configured to transmit a failure notification to the request source terminal upon determining that the permission notifications are not receivable from the majority of representative terminals in response to the permission requests.

(Supplementary Note 31)

The program according to supplementary note 29 or 30, further causing the computer to function as means configured to transmit cancel notifications to the representative terminals, to which the permission requests have been transmitted, upon determining that the permission notifications are not receivable from the majority of representative terminals in response to the permission requests.

(Supplementary Note 32)

A program for causing a computer to function as a representative terminal included in a network setting changing system for changing setting of a network where a plurality of terminals are connected, the program causing the computer to function as:
- means configured to receive a permission request from a selected representative terminal;
- means configured to transmit a permission notification to the selected representative terminal in response to the permission request;
- means configured to reset a permissible status flag upon transmitting the permission notification in response to the permission request; and
- means configured to transmit a non-permission notification instead of the permission notification in response to the permission request in a case where the permissible status flag is reset at the time of receiving the permission request.

(Supplementary Note 33)

The program according to supplementary note 32, further causing the computer function as means configured to set the permissible status flag upon executing the setting in accordance with an execution instruction received from a request source terminal.

(Supplementary Note 34)

The program according to supplementary note 32 or 33, further causing the computer function as means configured to set the permissible status flag upon receiving a cancel notification from the selected representative terminal.

The present application is based upon and claims the benefit of priority from Japanese Patent Application No. 2011-117974 (filed on May 26, 2011) under the Paris Convention. The disclosure of Japanese Patent Application No. 2011-117974 is incorporated herein by reference to Japanese Patent Application No. 2011-11794 in its entirety.

Although the exemplary embodiments of the present invention have been explained in detail, it should be understood that various changes, substitutions and alternatives may be made therein without departing from the spirit and scope of the present invention defined in claims. Further, the inventors intend that the scope of equivalents of the claimed invention shall be maintained even if claim amendment is made in pursuance of this application.

INDUSTRIAL APPLICABILITY

A method of changing network settings, a system therefor and a terminal used in the system according to the present invention are industrially applicable because automation of changing setting for network setting items may be achieved on an ad hoc network which does not have a specific base station.

What is claimed is:

1. A network setting changing method for changing a setting of a network in which a plurality of terminals are connected, the method comprising:
    transmitting a setting change request from a request source terminal to a selected representative terminal, wherein the request source terminal is one of the plurality of terminals, the selected representative terminal selected from a plurality of representative terminals, the plurality of representative terminals selected from the plurality of terminals;
    transmitting, upon receiving the setting change request, permission requests from the selected representative terminal to at least a majority of the plurality of representative terminals;
    receiving, by the majority of the plurality of representative terminals, a permission request from the selected representative terminal;
    transmitting a permission notification to the selected representative terminal in response to the permission request in a case where a permissible status flag is set at a time of receiving the permission request;
    resetting the permissible status flag in the representative terminal, which has transmitted the permission notification, in response to the permission request;
    transmitting from the representative terminal a non-permission notification instead of the permission notification in response to the permission request in a case where the permissible status flag is reset at the time of receiving the permission request;
    transmitting a success notification from the selected representative terminal to the request source terminal upon receiving permission notifications from the majority of the plurality of representative terminals in response to the permission requests;
    transmitting from the request source terminal to the plurality of terminals, execution instructions comprising at least a content of setting change, upon receiving the success notification; and
    changing the setting according to the content of setting change in the plurality of terminals which have received the execution instructions,
    wherein the permissible status flag indicates whether changing the setting of the network is permissible.

2. The network setting changing method according to claim 1, further comprising transmitting a failure notification from the selected representative terminal to the request source terminal upon determining that the permission notifications are not receivable from the majority of representative terminals in response to the permission requests.

3. The network setting changing method according to claim 1, further comprising setting the permissible status flag upon executing the change of setting in the representative terminal.

4. The network setting changing method according to claim 1, further comprising:
    transmitting cancel notifications from the selected representative terminal to the representative terminals to which the permission requests have been transmitted upon determining that the permission notifications are not receivable from the majority of representative terminals in response to the permission requests; and
    setting the permissible status flags in the representative terminals upon receiving the cancel notifications.

5. The network setting changing method according to claim 1, further comprising transmitting from the terminal which has received the execution instruction, upon determining that some inconvenience is to be caused by executing the setting change in accordance with the content of setting change, a setting change request in order to transmit execution instructions comprising a content of setting change corresponding to contents of setting neither before nor after setting change in accordance with the received execution instruction.

6. The network setting changing method according to claim 1, further comprising transmitting from a plurality of the plurality of terminals, to other terminals of the plurality of terminals, information related to inconvenient setting,
    wherein a terminal having received the success notification after receipt of the information related to inconvenient setting transmits the execution instruction comprising a content of setting change which makes the setting not the same as the inconvenient setting.

7. A network setting changing system for changing a setting of a network in which a plurality of terminals are connected, the system comprising
    a request source terminal comprising means to transmit a setting change request to a selected representative terminal, wherein the request source terminal is one of the plurality of terminals, the selected representative terminal is selected from a plurality of representative terminals, and the plurality of representative terminals is selected from the plurality of terminals;
    the selected representative terminal comprising means to, upon receiving the setting change request, transmit permission requests to at least a majority of the plurality of representative terminals;
    the plurality of representative terminals comprising means to receive a permission request from a selected representative terminal;
    the plurality of representative terminals comprising means to transmit a permission notification to the selected representative terminal in response to the permission request in a case where a permissible status flag is set at a time of receiving the setting change request;
    the plurality of representative terminals comprising means to reset the permissible status flag upon transmitting the permission notification in response to the permission request;
    the plurality of representative terminals comprising means to transmit a non-permission notification instead of the permission notification in response to the permission request in a case in which the permissible status flag is reset at the time of receiving the permission request;

the selected representative terminal comprising means to transmit a success notification to the request source terminal upon receiving permission notifications from the majority of the plurality of representative terminals in response to the permission requests;

the request source terminal comprising means to transmit, to the plurality of terminals, execution instructions comprising at least a content of setting change upon receiving the success notification, and each of the plurality of terminals, which have received the execution instructions, comprising means to change the setting according to the content of setting change, wherein the permissible status flag indicates whether changing the setting of the network is permissible.

8. A representative terminal, of a plurality of representative terminals, in a network setting changing system for changing a setting of a network in which a plurality of terminals are connected, wherein the representative terminal is one of a plurality of representative terminals, and the plurality of representative terminals are selected from the plurality of terminals, the representative terminal comprising:

means to receive a permission request from a selected representative terminal, the selected representative terminal selected from the plurality of representative terminals;

means to transmit a permission notification to the selected representative terminal in response to the permission request in a case in which a permissible status flag is set at a time of receiving the permission request;

means to reset the permissible status flag upon transmitting the permission notification in response to the permission request; and means to transmit a non-permission notification instead of the permission notification in response to the permission request in a case in which the permissible status flag is reset at the time of receiving the permission request, wherein the permissible status flag indicates whether changing the setting of the network is permissible.

9. The representative terminal according to claim 8, comprising means to set the permissible status flag upon executing the change of setting in accordance with an execution instruction received from a request source terminal.

10. The representative terminal according to claim 8, comprising means to set the permissible status flag upon receiving a cancel notification from the selected representative terminal.

11. A non-transitory computer-readable medium, on which a program is recorded, said program causing a computer to function as a representative terminal in a network setting changing system for changing a setting of a network in which a plurality of terminals are connected, wherein the representative terminal is one of a plurality of representative terminals, and the plurality of representative terminals is selected from the plurality of terminals, the representative terminal comprising:

means to receive a permission request from a selected representative terminal, the selected representative terminal selected from the plurality of representative terminals;

means to transmit a permission notification to the selected representative terminal in response to the permission request in a case where a permissible status flag is set at a time of receiving the permission request;

means to reset the permissible status flag upon transmitting the permission notification in response to the permission request; and means to transmit a non-permission notification instead of the permission notification in response to the permission request in a case where the permissible status flag is reset at a time of receiving the permission request, wherein the permissible status flag indicates whether changing the setting of the network is permissible.

* * * * *